United States Patent [19]

Takei et al.

[11] Patent Number: 4,833,616
[45] Date of Patent: May 23, 1989

[54] DEVICE FOR CONTROLLING OPERATION OF INJECTION MOLDER

[75] Inventors: Kazuo Takei, Hachioji; Susumu Toda, Yokohama; Yutaka Nakaya, Yokohama; Akimitsu Mita, Yokohama, all of Japan

[73] Assignees: Nifco Kasei Inc., Tokyo; Nifco Inc., Yokohama, both of Japan

[21] Appl. No.: 927,381

[22] Filed: Nov. 6, 1986

[30] Foreign Application Priority Data

Nov. 6, 1985 [JP] Japan ................... 60-249446

[51] Int. Cl.$^4$ ............................. G06F 9/00
[52] U.S. Cl. ..................... 364/473; 364/921.4
[58] Field of Search ............ 364/200, 900, 473, 476

[56] References Cited

U.S. PATENT DOCUMENTS

| 4,326,255 | 4/1982 | Fujita | 364/476 |
| 4,338,115 | 7/1982 | Farkas | 364/476 |
| 4,344,142 | 8/1982 | Diehr, II et al. | 364/473 |
| 4,369,052 | 1/1983 | Hotmer | 364/476 |
| 4,427,431 | 1/1984 | Mumford et al. | 364/476 |
| 4,695,237 | 9/1987 | Inaba | 364/473 |

Primary Examiner—Gareth D. Shaw
Assistant Examiner—John G. Mills
Attorney, Agent, or Firm—Oblon, Fisher, Spivak, McClelland & Maier

[57] ABSTRACT

A device for controlling the operation of an injection molder is disclosed. A fall detection signal is produced when a product falls from the mold. If the full detection signal is generated before the lapse of a fixed time preset in a timer from the instant of appearance of a mold-opening signal from a mold-opening signal generator, the next molding cycle is started. If no fall detection signal is generated within the preset time of the timer, an alarm is generated.

3 Claims, 4 Drawing Sheets

DEVICE FOR CONTROLLING OPERATION OF INJECTION MOLDER

FIELD OF THE INVENTION AND RELATED ART STATEMENT

This invention relates to a control device for controlling a sequence of injection molder operations such as mold closing, mold opening and product kick-out.

In the injection molder, a sequence of operations such as closing of the mold, injection of material, opening of the mold and kick-out of the product is controlled to be performed continuously.

FIG. 1 is a block diagram showing a typical prior art operation control device for an injection molder. This prior art device will now be described. Referring to FIG. 1, reference numeral 1 designates a mold-opening signal generator for supplying a mold-opening signal to a mold driver (not shown), which drives a movable section of a mold, thus opening the mold. Reference 2 designates a kick-out pin drive signal generator for providing a kick-out pin drive signal to a kick-out pin driver (not shown) which kicks out the product from the open mold. Reference numeral 3 designates a mold-closing signal generator for generating a mold-closing signal to the mold driver (not shown). Reference numeral 4 designates an injection signal generator for providing an injection signal to an injector (not shown) for injecting molding material into the mold. Reference numeral 5 designates a timer in which time T1 for opening the mold and kicking out the product is preset. Reference numeral 6 designates a timer in which an injection time is preset.

FIG. 2 shows a timing chart illustrating how the operation of an injection molder is controlled by the prior art operation control device shown in FIG. 1.

Referring to the figure, when a mold-opening signal "a" is supplied from the mold-opening signal generator 1 to the mold driver, the movable section of the mold is opened by the mold driver. The mold-opening signal "a" is also supplied to the kick-out pin drive signal generator 2 and timer 5. When the kick-out pin drive signal generator 2 receives the mold-opening signal "a", it provides a kick-out pin drive signal "b" to the kick-out pin driver to cause the product to be kicked out of the open mold by a kick-out pin.

Meanwhile, when the timer 5 receives the mold-opening signal "a", it starts a time-measuring operation and, after the lapse of the preset time T1, it supplies a time lapse signal "c" to the mold-opening signal generator 1, kick-out pin drive signal generator 2, mold-closing signal generator 3 and injection signal generator 4. With the appearance of the time lapse signal "c" the mold-opening signal "a" from the mold-opening signal generator 1 and the kick-out pin drive signal "b" from the kick-out pin drive signal generator 2 are discontinued. Further, when the mold-casting signal generator 3 receives the time lapse signal "c", it supplies a mold-closing signal "d" to the mold driver. As a result, the mold is closed, and the injection signal "e" is supplied from the injection signal generator 4 to the injector so that molding material is injected into the mold. When the timer 6 receives the injection signal "e", it supplies, after lapse of a preset time T4, the time lapse signal "f" to mold-opening signal generator 1, mold-closing signal generator 3 and injection signal generator 4. At this time, the mold-closing signal from the mold-closing signal generator 4 and the injection signal from the injection signal generator 4 are discontinued. Meanwhile, when the mold-opening signal generator 1 receives the time lapse signal "f" from the timer 6, it provides a mold-opening signal "a", and the sequence of operations described above is repeated.

In the above construction, it is necessary to provide a number of kick-outs larger than normally required to ensure reliable release of the product from the mold caused by the kick-out pin. For this reason, the preset time T1 of the timer 5 is selected such that the kick-out pin is operated for a preset number of times that is greater than usually needed. Therefore, the product is usually caused to fall from the mold after lapse of a time (for instance as shown at T2 in FIG. 2) which is far shorter than the time T1 preset in the timer 5. The kick-out operation, however, is continued after the fall of the product till the lapse of the preset time T1. This means that the next mold-closing and injection operations cannot be started immediately after the fall of the product. That is, a wasted time T3 passes after the fall of the product. The molding operation cycle of the injection molder is, therefore, prolonged that much to result in a reduced operation efficiency.

Further, even where the kick-out operation is continued for a time longer than is normally adequate, failure of the product to fall from the mold still frequently results. In such a case, the mold-closing operation is caused with the product remaining in the mold after the lapse of a predetermined time preset in the timer by the operation control device of the above construction, thus leading to frequent rupture of the mold.

Further, since the kick-out operation is continued more than is necessary, the kick-out pin and mold are worn out due to friction between them, resulting in the generation of burrs on the product. Particularly, in case of precision products repair of the mold or replacement of kick-out pin is sometimes inevitable.

OBJECT AND SUMMARY OF THE INVENTION

An object of the invention is to provide a device for controlling the operation of an injection molding, which can eliminate wasted time in the kick-out pin operation to reduce the molder cycle time and greatly improve the operation efficiency and also eliminate rupture of the mold or like accident due to retention of the product in the mold.

To attain the above object of the invention, there is provided a device for controlling the operation of an injection molder, which comprises a mold-opening signal generator for generating a mold-opening signal, a kick-out pin drive signal generator for generating a kick-out pin drive signal in response to the mold-opening signal, a timer for generating a time lapse signal after the lapse of a predetermined period of time from the instant of reception of the mold-opening signal, a product fall detector which upon detection of the fall of a product from a mold generates a fall detection signal which causes discontinuation of the mold-opening signal from the mold-opening signal generator and the kick-out pin drive signal from the kick-out pin drive signal generator, a judging unit for passing the fall detection signal when the fall detection signal from the product fall detector is detected before reception of the time lapse signal from the timer, a mold-closing signal generator for generating a mold closing signal upon receipt of a fall detection signal from the judging unit, and an injection signal generator for generating an injection signal after generation of the mold-closing signal and supplying a mold-opening signal for causing the mold-opening signal generator to generate a mold-opening signal after generation of the injection signal.

When a fall detection signal indicative of the fall of a product from the mold is provided before generation of the time lapse signal from the timer, the operation of closign the mold and injecting molding material is started. Thus, the molding cycle is shortened compared to the case of a method where the closing of mold and injection of material are started after the lapse of a predetermined period of time preset in a timer.

Further, if no fall of product is recognized before the lapse of the time preset in the timer, an alarm to interrupt the operation of the molder is generated to ensure safety of the injection molding operation.

The above and other objects and features of the invention will become more apparent from the following detailed description with reference to the accompanying drawings.

DETAILED DESCRIPTION OF THE PREFERRED EMBODIMENT

Figure 1:
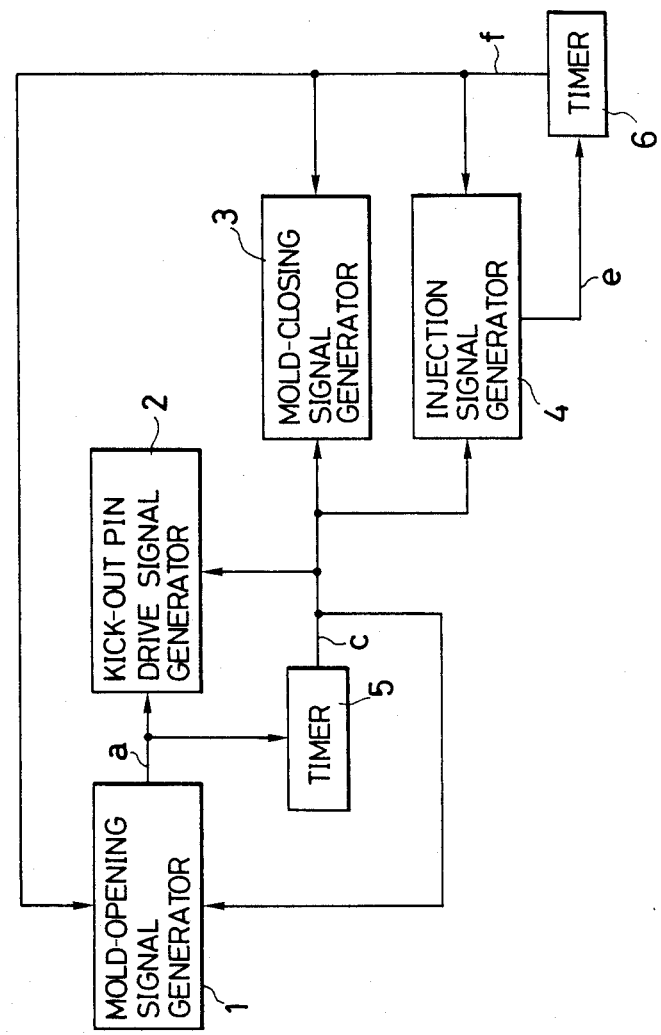
FIG. 1 is a block diagram showing a prior art device for controlling the operation of an injection molder.
Figure 2:
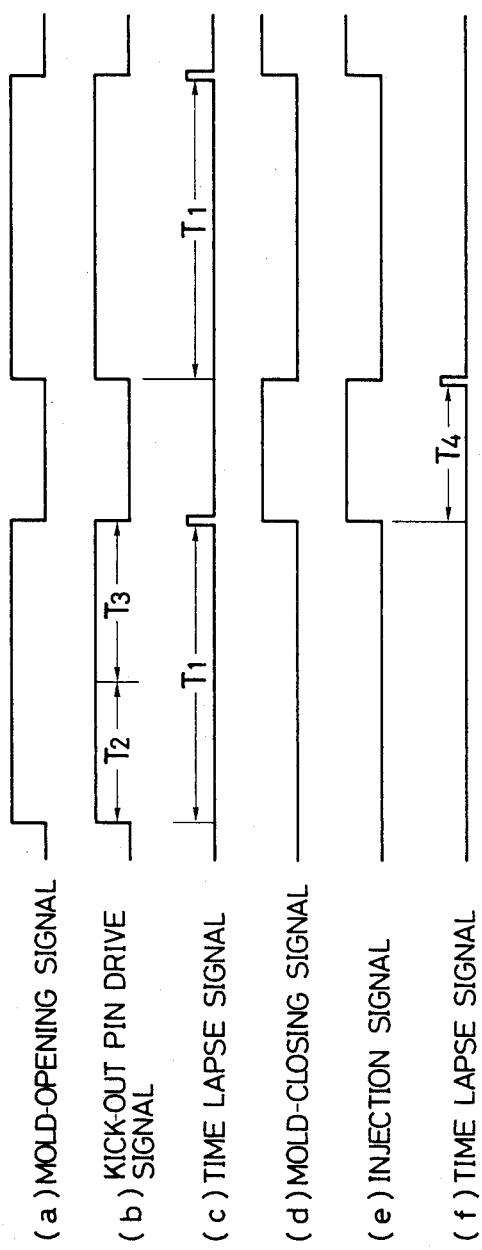
FIG. 2 is a timing chart for explaining the control of operation of various parts shown in FIG. 1.
Figure 3:
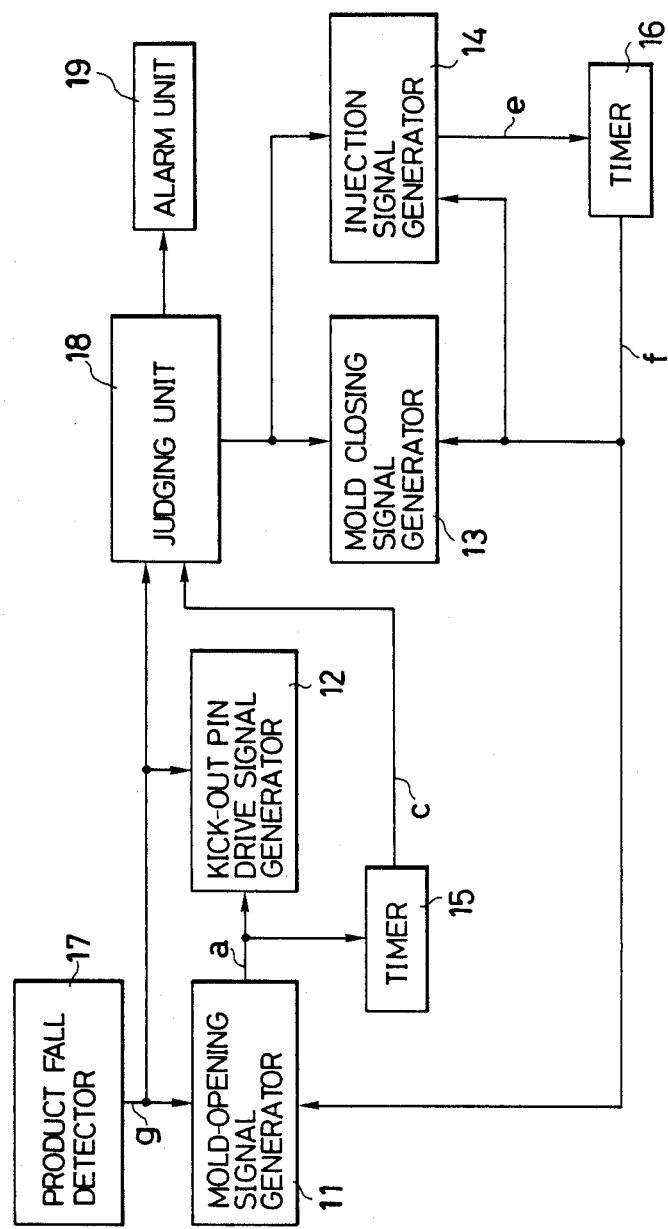
FIG. 3 is a block diagram showing an embodiment of the device for controlling the operation of the injection molder according to the invention.

FIG. 3 is a block diagram showing an embodiment of the device for controlling the operation of an injection molder according to the invention.

Referring to FIG. 3, reference numeral 11 designates a mold-opening signal generator for generating a mold-opening signal, and numeral 12 a kick-out pin drive signal generator for generating a kick-out pin drive signal in response to the mold-opening signal. Reference numeral 15 is a timer for providing a time lapse signal after the lapse of a predetermined time T1 from the instant of reception of the mold-opening signal. The preset time T1 is selected to be long enough to provide a number of kick-outs which is greater than normally required, as in the prior art example described above. Referrence numeral 17 is a product fall detector. When it detects the fall of a product from the mold, the fall detector 17 produces a fall detection signal causing discontinuance of the mold-opening signal from the mold-opening signal generator 11 and a kick-out pin drive signal from the kick-out pin drive signal generator 12.

Figure 4:
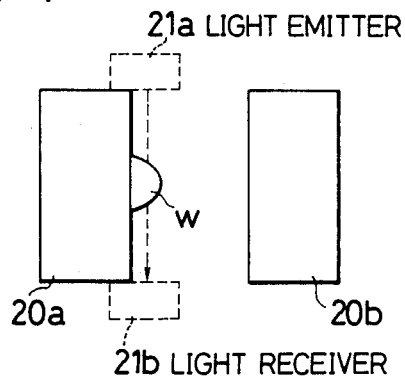
FIG. 4 is a schematic view showing a mold and a detector in the injection molder.

FIG. 4 shows the product fall detector 17 in this embodiment. As is shown, the detector 17 includes a light emitter 21a and a light receiver 21b, which face each other on the opposite sides of a mold. As shown in FIG. 4, when a movable portion 20a of the mold is opened with respect to a stationary portion 20b, the product "w" in the mold is kicked out by a kick-out pin (not shown). The normal fall of the product thus is confirmed when it is detected that the product crosses the light path from the light emitter 21a to the light receiver 21b. While in this embodiment the product fall detector uses the light emitter and light receiver, this is by no means limitative. For example, it is possible to adopt a video processing system using a television camera or a supersonic detection method. A contactless detection system is preferred, but it is also possible to adopt a contact system.

Reference numeral 18 designates a judging unit. When it receives a fall detection signal from the product fall detector 17 before reception of a time lapse signal from the timer 15, the unit 18 passes the fall detection signal. When it does not receive any fall detection signal before the reception of the time lapse signal, the unit 18 provides an abnormality signal. Reference numeral 13 designates a mold-closing signal generator, which generates a mold-closing signal when it receives the fall detection signal passed by the judging unit 18. Reference numeral 14 designates an injection signal generator for generating an injection signal. Reference numeral 16 designates a timer in which an injection time T4 is preset. When the injection time T4 has passed from the instant of reception of the injection signal, the timer 16 produces a time lapse signal for discontinuing the mold-closing signal and injection signal. The time lapse signal is also supplied to the mold-opening signal generator 11. Reference numeral 19 designates an alarm unit for providing an alarm sound or an alarm display in response to the reception of an abnormality signal from the judging unit 18.

Figure 5:
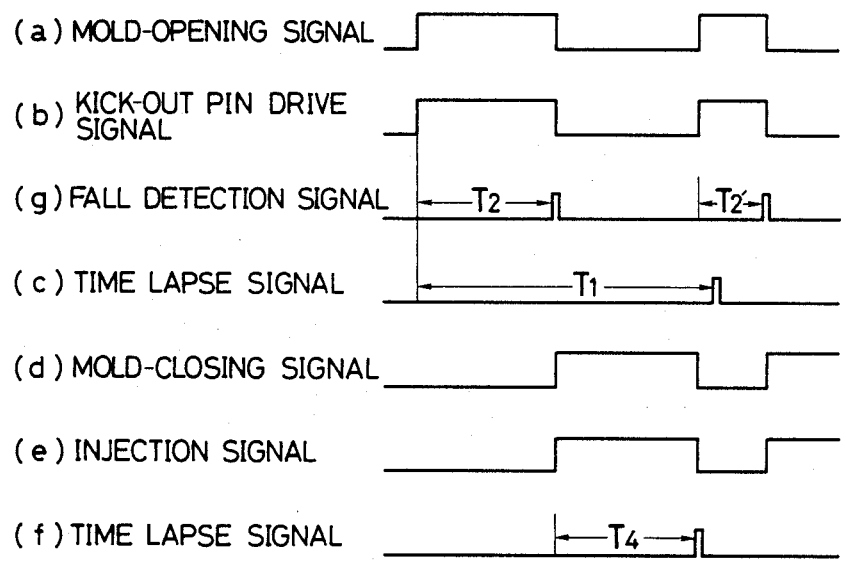
FIG. 5 is a timing chart for explaining the control of operations of various parts shown in FIG. 2.

FIG. 5 is a timing chart illustrating the control of operation of the injection molder. When the mold-opening signal "a" is supplied from the mold-opening signal generator, the movable portion 20a of the mold is opened by a mold driver (not shown). With the appearance of the mold-opening signal "a", the kick-out drive signal generator 12 produces the kick-out pin drive signal "b" to start the kick-out of the product by the kick-out pin. When the product falls from the mold after the lapse of time T2 from the instant of start of the kick-out, the product fall detector 17 detects the fall and produces the fall detection signal "g". With the appearance of the fall detection signal "g", the mold-opening signal "a" from the mold-opening signal generator 11 and pin drive signal "b" from the kick-out pin drive signal generator 2 are discontinued.

The timer 15 starts a time measuring operation from the instant of reception of the mold-opening signal "a". When the preset time T1 has passed, it provides the time lapse signal "c" to the judging unit 18.

When the judging unit 18 receives the fall detection signal "g" from the product fall detector 17 before reception of the time lapse signal "c" from the timer 15, it passes the signal "g". As a result, the mold-closing signal generator 13 generates the mold-closing signal "d" to effect closing of the mold. At the same time, the injection signal generator 14 generates the injection signal "e" to cause injection of molding material into the mold. The injection signal "e" is also supplied to the timer 16. After the time lapse signal "f" is output from the timer 16, the mold-closing signal "d" and injection signal "e" are discontinued, and then the mold-opening signal is supplied.

When the fall detection signal is supplied after time T2', as shown in FIG. 5, the next step of mold-closing operation is started.

When the fall detection signal "g" is not generated until the appearance of the time lapse signal "c" from the timer 15, the judging unit 18 judges that there is an abnormality, so that it supplies a signal to the alarm unit 19. The alarm unit 19 thus provides an alarm to interrupt the following operation.

As has been described in the foregoing, the device for controlling the operation of injection molder having the above construction according to the invention has the following advantages.

(i) Since the mold-closing operation is started not after the lapse of a predetermined period of time but immediately after the fall of the product, the molding cycle period can be greatly reduced to substantially improve the operation efficiency.

(ii) Since the mold-closing operation is caused when and only when the fall of the product is confirmed by the product fall detector in a predetermined period of time, it is possible to prevent rupture of the mold by a product otherwise possibly remaining in the mold.

(iii) As soon as the product is kicked out and falls, the kick-out operation is discontinued to avoid unnecessary continuation of the kick-out operation of the kick-out pin. It is thus possible to greatly extend the life of the mold.

What is claimed is:

1. A system for controlling a sequence of operations of an injection molder including mold opening and closing means, material injection means and product kick-out means by supplying signals to the injection molder, comprising:

a mold-opening signal generator for generating a mold-opening signal and supplying it to the mold opening and closing means to open a mold, a kick-out pin drive signal generator for generating a kick-out pin drive signal in response to said mold-opening signal and supplying it to the product kick-out means to drive a kick-out pin, a timer for generating a time lapse signal after the lapse of a predetermined period of time from the instant of reception of said mold-opening signal supplied from said mold-opening signal generator, a product fall detector which upon detection of the fall of a product from the mold supplies a fall detection signal both to said mold-opening signal generator to discontinue said mold-opening signal and to said kick-out pin drive signal generator to discontinue said kick-out pin drive signal, a judging unit which upon reception of said time lapse signal from said timer before reception of said fall detection signal from said product fall detector generates an abnormality signal and which upon reception of said fall detection signal before reception of said time lapse signal allows said fall detection signal to pass therethrough.

a mold-closing signal generator which upon reception of said fall detection signal passed through said judging unit generates a mold-closing signal and supplies it to the mold opening and closing means to close the mold, and an injection signal generator for generating an injection signal after generation of said mold-closing signal and supplying it to the material injection means to cause the material injection means to effect injection molding and, upon completion of the injection molding, supplying to said mold-opening signal generator a signal for causing said mold-opening signal generator to generate a mold opening signal.

2. The system according to claim 1, wherein said product fall detector includes a light emitter and a light receiver which are provided to interpose a molding area of the mold therebetween.

3. The system according to claim 1, further comprising an alarm unit for generating an alarm in response to said abnormality signal from said judging unit.

* * * * *